United States Patent
Banerjee et al.

(10) Patent No.: US 9,680,893 B2
(45) Date of Patent: Jun. 13, 2017

(54) METHOD AND SYSTEM FOR EVENT STATE MANAGEMENT IN STREAM PROCESSING

(71) Applicant: Yahoo! Inc., Sunnyvale, CA (US)

(72) Inventors: Joy Banerjee, San Jose, CA (US); Shail Aditya Gupta, Bangalore (IN)

(73) Assignee: EXCALIBUR IP, LLC, Sunnyvale, CA (US)

( * ) Notice: Subject to any disclaimer, the term of this patent is extended or adjusted under 35 U.S.C. 154(b) by 327 days.

(21) Appl. No.: 13/921,662

(22) Filed: Jun. 19, 2013

(65) Prior Publication Data

US 2014/0280766 A1    Sep. 18, 2014

(30) Foreign Application Priority Data

Mar. 12, 2013 (IN) ................ 1044/CHE/2013

(51) Int. Cl.
*G06F 15/16* (2006.01)
*H04L 29/06* (2006.01)
*G06F 9/46* (2006.01)

(52) U.S. Cl.
CPC ............ *H04L 65/60* (2013.01); *G06F 9/466* (2013.01); *H04L 65/602* (2013.01)

(58) Field of Classification Search
CPC .......... H04L 65/00; H04L 65/40; H04L 65/60
USPC ................................. 709/217, 219
See application file for complete search history.

(56) References Cited

U.S. PATENT DOCUMENTS

| | | | |
|---|---|---|---|
| 2011/0282982 A1* | 11/2011 | Jain ................ | G06F 9/5094 709/223 |
| 2013/0103817 A1* | 4/2013 | Koponen ........... | G06F 9/45558 709/223 |
| 2013/0318036 A1* | 11/2013 | Shah ................. | G06Q 50/01 707/609 |
| 2014/0229628 A1* | 8/2014 | Mandal ............. | H04L 65/60 709/231 |

OTHER PUBLICATIONS

Peng, D. et al., Large-Scale Incremental Processing Using Distributed Transactions and Notifications, 9th., USENIX Symposium on Operating Systems Design and Implementation, Oct. 2010, Vancouver, Canada, pp. 1-14.

* cited by examiner

*Primary Examiner* — Wing F Chan
*Assistant Examiner* — Andrew Woo
(74) *Attorney, Agent, or Firm* — Pillsbury Winthrop Shaw Pittman LLP

(57) ABSTRACT

Method, system, and programs for event state management in stream processing. In one example, a batch of events is created from a plurality of input events. The batch is associated with a state and is to be processed in one or more stages. The batch of events is stored in a persistent storage. The state associated with the batch is updated based on results of processing the batch in the one or more stages. The state associated with the batch is retrieved.

17 Claims, 18 Drawing Sheets

| Row key | Event Column-family | |
|---|---|---|
| Batch-id1_task-id1 | Col1=events array, | Col2=events array |
| Batch-id1_task-id2 | Col1=events array, | Col2=events array |

Fig. 7

| Row Key | Column Family stage1 | | Column Family stage2 | | Column Family stage3 | |
|---|---|---|---|---|---|---|
| | id1 | id2 | id1 | id2 | id1 | id2 |
| User-gen-key | value | value | value | value | value | value |

Fig. 9

METHOD AND SYSTEM FOR EVENT STATE MANAGEMENT IN STREAM PROCESSING

CROSS-REFERENCE TO RELATED APPLICATIONS

The present application claims priority to Indian Application Serial No 1044/CHE/2013, filed Mar. 12, 2013, which is incorporated herein by reference in its entirety.

BACKGROUND

Technical Field

The present teaching relates to methods, systems, and programming for stream processing. Particularly, the present teaching is directed to methods, systems, and programming for event state management in stream processing.

Discussion of Technical Background

Near-real time stream processing is an important computation paradigm. Some use cases include quick response to external events (e.g. stock ticker), early trend detection (e.g. buzzing news or search queries), and dynamic user modeling and personalization (e.g. view/click processing). Currently, known applications use different (mostly ad hoc) streaming technology and provides different levels of services with regard to system reliability, fault-tolerance, persistence of data, and atomicity and consistency of state management. In contrast, almost all offline bulk processing is either moved or getting moved to HADOOP platform, which provides a standard functional programming model, reliability and repeatability guarantees, and redundant HDFS storage.

A large class of near real-time stream processing applications needs to manipulate state in some form. This state could take the form of key-value database store, windows of time-series data, aggregations of past data or any combination thereof. Typically, enterprise-level applications require the state to be maintained with classical ACID (atomicity, consistency, isolation, and durability) qualities. However, most consumer applications can operate under a simpler ACID2.0 (associative, commutative, idempotent, and distributed) model, which is much more cost-effective and scalable for large data. The challenge is to create an appropriate execution platform that implements this model in a manner that is easy to use and operate. Also, many streaming applications need to provide a consistent bulk view of the state data in order to be seeded, processed, enriched, and accessed in bulk using a large-scale, fault-tolerant, offline grid processing framework such as MapReduce. It is much more efficient if the same infrastructure can handle both requirements. Additionally, the system needs to provide a consistent and repeatable view of the state with respect to the stream processing even in face of failures.

Known stream processing frameworks address some aspects of high-throughput, low latency stream processing. But in most systems, the stream processing is not directly integrated with a state management store that is also available for offline processing. For example, some known stream processing frameworks lack any persistent state storage and read-write synchronization of their own. In other words, those know solutions don't give much importance to consistency and reliability of the state generated by online systems. Other known solutions perform read-write synchronization at the event level, which unduly increases the overhead of state management. Therefore, there is a need to provide an improved solution for event state management in stream processing to solve the above-mentioned problems.

SUMMARY

The present teaching relates to methods, systems, and programming for event state management in stream processing.

In one example, a method implemented on at least one machine each having at least one processor, storage, and a communication platform connected to a network for event state management in stream processing is disclosed. A batch of events is created from a plurality of input events. The batch is associated with a state and is to be processed in one or more stages. The batch of events is stored in a persistent storage. The state associated with the batch is updated based on results of processing the batch in the one or more stages. The state associated with the batch is retrieved.

In a different example, a system for event state management in stream processing includes an input event managing unit, a batch event storage, an event batch write managing unit, and an event batch read managing unit. The input event managing unit is configured to create a hatch of events from a plurality of input events. The batch is associated with a state and is to be processed in one or more stages. The hatch event storage is configured to store the batch of events. The event batch write managing unit is configured to update the state associated with the batch based on results of processing the batch in the one or more stages. The event batch read managing unit is configured to retrieve the state associated with the batch.

Other concepts relate to software for event state management in stream processing. A software product, in accordance with this concept, includes at least one machine-readable non-transitory medium and information carried by the medium. The information carried by the medium may be executable program code data regarding parameters in association with a request or operational parameters, such as information related to a user, a request, or a social group, etc.

In one example, a machine readable and non-transitory medium having information recorded thereon for event state management in stream processing, wherein the information, when read by the machine, causes the machine to perform a series of steps. A batch of events is created from a plurality of input events. The batch is associated with a state and is to be processed in one or more stages. The batch of events is stored in a persistent storage. The state associated with the batch is updated based on results of processing the batch in the one or more stages. The state associated with the batch is retrieved.

BRIEF DESCRIPTION OF THE DRAWINGS

The methods, systems, and/or programming described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

FIG. 7 is an exemplary structure of an input event persistence table according to an embodiment of the present teaching;

FIG. 9 is an exemplary structure of a batch event data table according to an embodiment of the present teaching;

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, systems, components, and/or circuitry have been described at a relatively high-level, without detail, in order to avoid unnecessarily obscuring aspects of the present teaching.

The present teaching describes method, system, and programming aspects of event state management in stream processing. The method and system described herein unify online stream processing and offline bulk processing by automatically creating and managing a stateful representation of the streaming, computation conforming to ACID2.0 requirements. The method and system persist input events, do periodic check-pointing, and also replay events automatically from persistent storage in case of failure. The method and system also handle read-write synchronization of state and provide a consistent data view even in presence of node and process failures. The experiments showed that the online stream processing system in the present teaching is highly scalable and exhibits very high performance characteristics. Absence of synchronization issues while keeping the state consistent proves the usefulness of the method and system described therein.

Additional novel features will be set forth in part in the description which follows, and in part will become apparent to those skilled in the art upon examination of the following and the accompanying drawings or may be learned by production or operation of the examples. The novel features of the present teachings may be realized and attained by practice or use of various aspects of the methodologies, instrumentalities and combinations set forth in the detailed examples discussed below.

Figure 1:
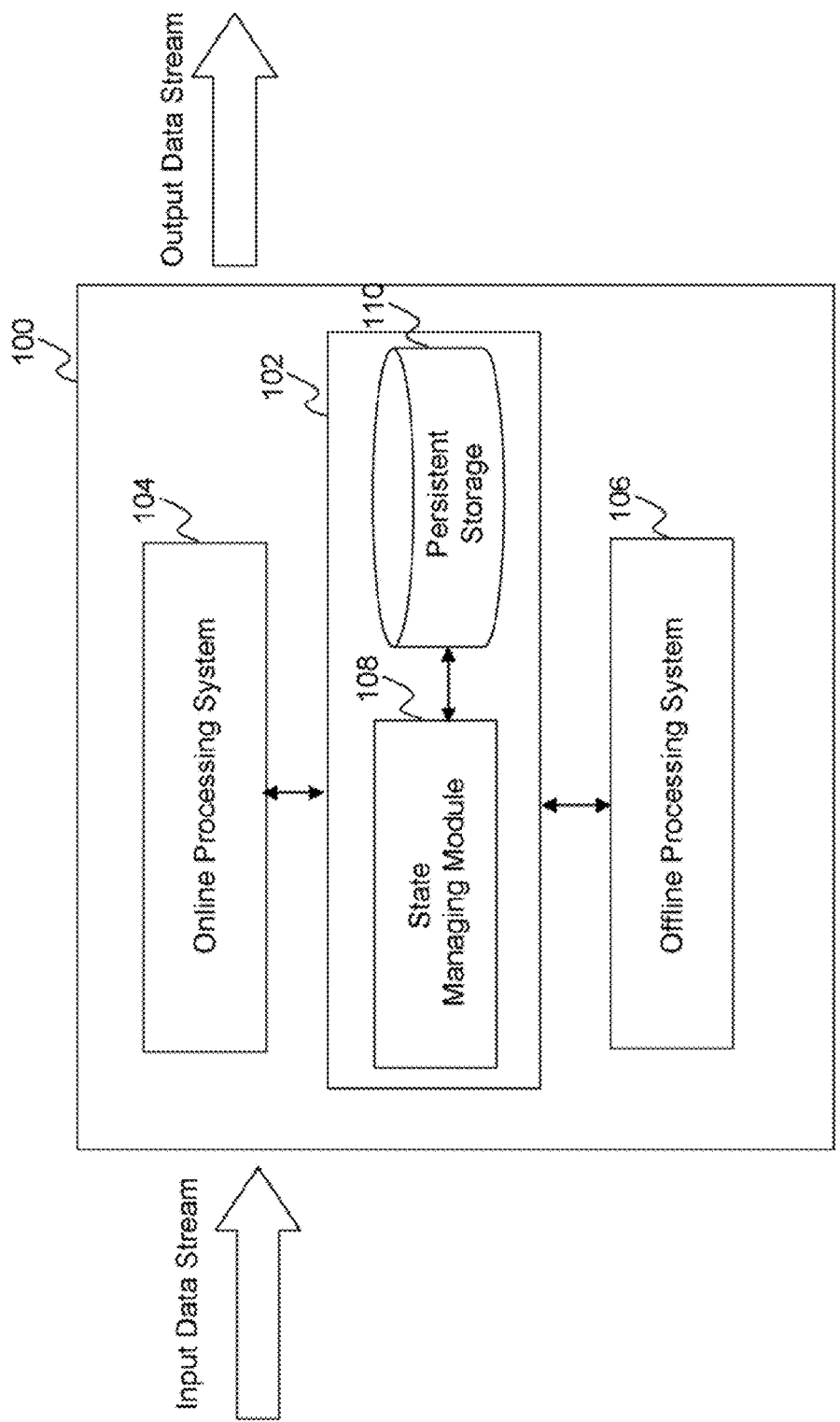
FIG. 1 depicts an exemplary architecture that unifies online stream processing and offline bulk processing by a system for event state management according to an embodiment of the present teaching.

FIG. 1 depicts an exemplary architecture that unifies online stream processing and offline bulk processing, by a system for event state management according to an embodiment of the present teaching. The architecture 100 includes an event state managing system 102, an online processing system 104, and an offline processing system 106. The online processing system 104 performs near-real time stream processing for various applications, such as quick response to external events (e.g. stock ticker), early trend detection (e.g. buzzing news or search queries), and dynamic user modeling and personalization (e.g. view/click processing). The near-real time processing referred herein may have an end-to-end latency from a few seconds to a few minutes. In this example, the online processing system 104 processes a stream of events while accumulating and referring back to data kept in a persistent store. An event may be any piece of data (or data representation of a physical happening) that has a specific time stamp attached to it and needs to be processed by a stream processing system. The events may be pushed by an external source in an input data stream to the source/input stage of a stream processing system, or they may be pulled by the stream processing, system one by one from the external source. In one example, the online processing system 104 may perform a near-real time trend analysis from search query logs and news headlines, personalized with user segments and gee-location. In another example, the online processing system 104 may conduct personalized content recommendations based on view-click joining of user online activity, in still another example, the online processing system 104 may build short term personalized user models based on aggregated user activities (e.g., page view, ads view, and search) for quick targeting. In any event, the online processing system 104 may support some or all of the following functional operations, such as event-driven, data flow oriented execution, data pattern matching and filtering, data enrichment, data aggregation over time windows, joins with historic state, and state machines and state transformations, in addition, the online, processing system 104 may have some or all of the following non-functional quality attributes, such as short latency (e.g., a few seconds to a few minutes), scalable throughput, reliable message processing, fault-tolerance, consistency, and durability.

The offline processing system 106 may be included in some stream processing applications to perform offline bulk processing on the input data stream. In the example of near-real time trend analysis from search query logs, the input events may be buffered up to a sufficiently large size or time interval, e.g., one hour, and then processed by the offline processing system 106 in an offline manner. In the example of short term personalized user models based on aggregated user activities, the input event stream may be redundantly processed both in real-time by the online processing system 104 and offline by the offline processing system 106 in order to be fault-tolerant overall.

The event state managing system 102 in this example bridges the gap between the online processing system 104 and the offline processing system 106 by creating a consistent model of shared event state, which is updated in near real-time by online stream processing, but still provides a reliable and repeatable view for offline bulk processing. In this example, the event state managing system 102 includes a state managing module 108 and persistent storages 110. The event state managing system 102 is capable of automatically creating and managing a stateful representation of the streaming computation by the state managing module 108 and recording the state metadata in the persistent storages 110. The event state managing system 102 may also persist input events, perform periodic check-pointing, and replay events by the state managing module 108 automatically from the persistent storages 110 in case of failure. The event state managing system 102 in this example is further configured to handle read-write synchronization of state and provide a consistent data view even in presence of node and process failures by the state managing module 108. The state referred herein may be any piece of information that needs to be saved in persistent store, aggregated over time, and referred back later during the course of stream processing. This information may be represented and saved as a key-value pair corresponding to a specific batch of events being processed at a specific stage. Subsequently, this information may be referred back by another stage queried over a window of batches spread over time. The event state managing system 102 provides persistent storages 110 to capture this state from various stages and also provides a mechanism to synchronize the reads and writes on a per batch basis implemented by the state managing module 108.

Figure 2:
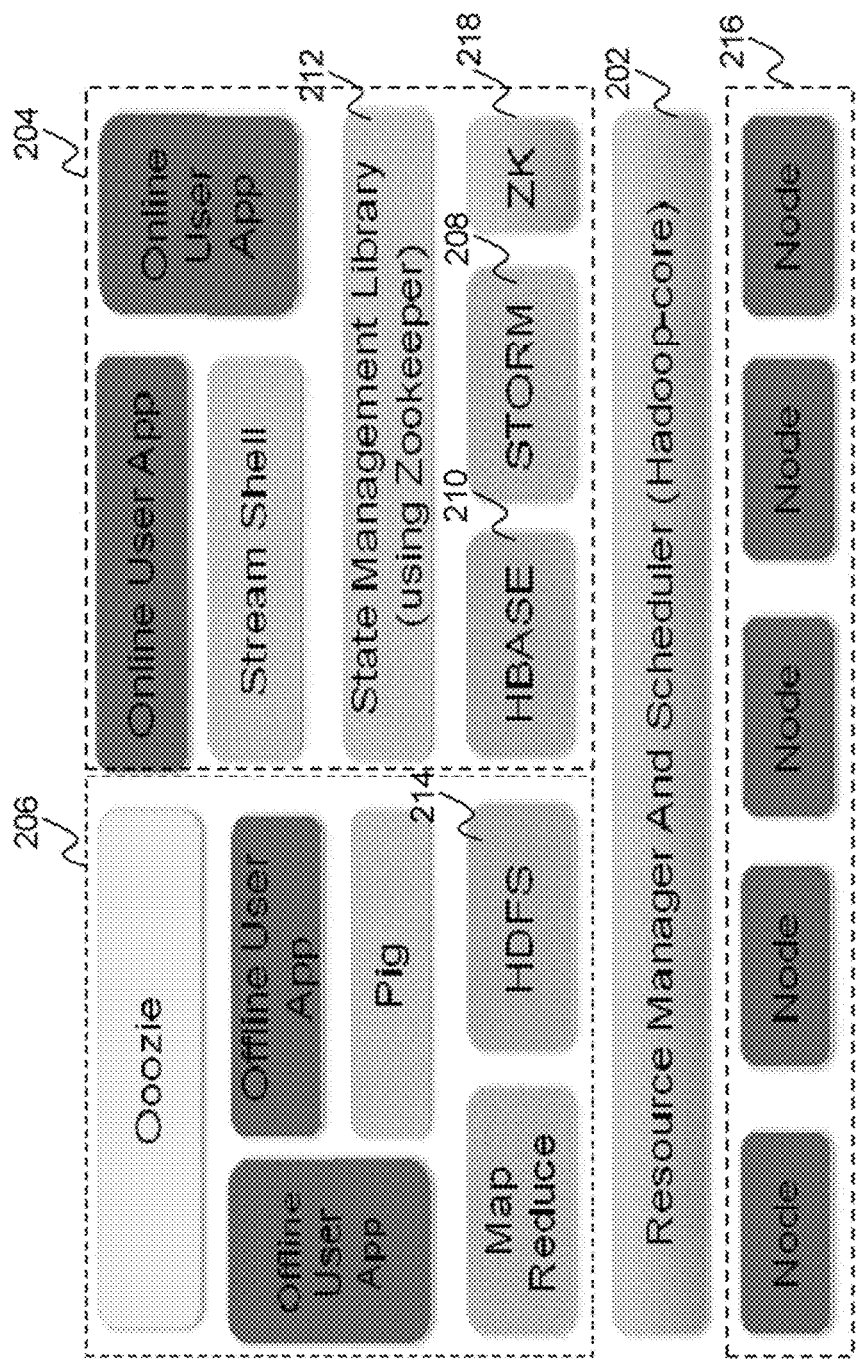
FIG. 2 is an exemplary block diagram of the architecture shown in FIG. 1 implemented on a distributed HADOOP platform according to an embodiment of the present teaching.

FIG. 2 is an exemplary block diagram of the architecture shown in FIG. 1 implemented on a distributed HADOOP platform according to an embodiment of the present teaching. In this example, a HADOOP-core infrastructure 202 is used as a common resource management layer to abstract out all hardware in the system. Both online stream processing units 204 and offline bulk processing units 206 are dynamically hosted on the resource management layer implemented on the HADOOP-core infrastructure 202. Main components of online stream processing units 204 include, for example. Storm 208, HBase 210, and the state management library 212 implemented using Zookeeper 218. The state management library 212 provides consistent data view to both online stream processing units 204 and offline bulk processing units 206 by exposing state for only completed or committed batches of events. MapReduce, Pig, Oozie, and similar workflow executor together may form the offline bulk processing units 206. HBase 210 and HDFS 214 in this example provide shared persistent storages. The state managing module 108 may be implemented in a state management library 212 with the help of ZooKeeper 218 in conjunction with other components, e.g., Storm 208 and HBase 210 for distributed event state management for both online stream processing units 204 and offline bulk processing units 206. The system in this example may be implemented in a distributed manner on a cluster having multiple physical processing nodes 216.

Figure 3:
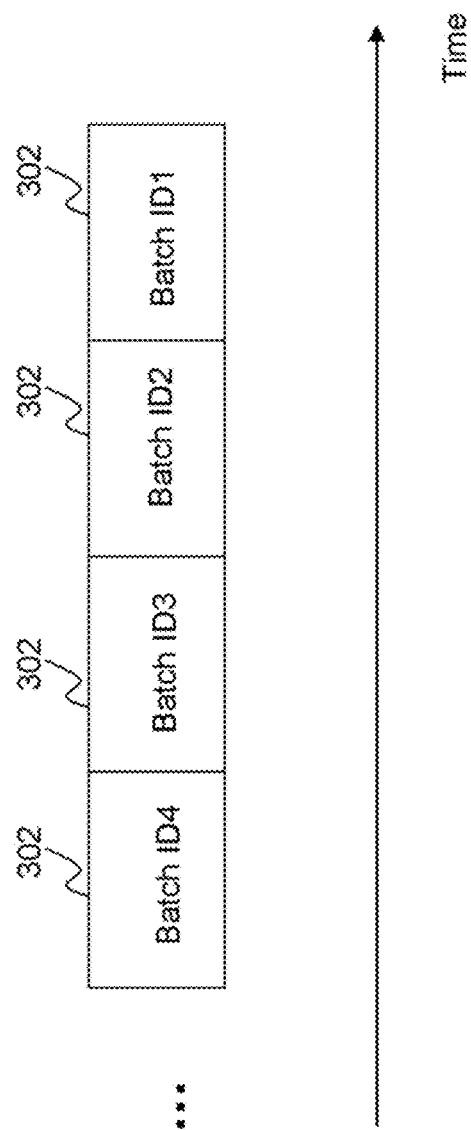
FIG. 3 is an exemplary depiction of batches of events according to an embodiment of the present teaching.

FIG. 3 is an exemplary depiction of batches of events according to an embodiment of the present teaching. In this example, input events are partitioned into small logical batches 302 over time by assigning them a unique batch-id upon arrival. The duration of a batch 302 may be decided based on near real-time requirements, e.g., from a few seconds to a few minutes. A set of events arriving during this time-window is defined as a batch of events 302 and is given, the same batch-id. It is understood that events may be still processed individually as they arrive, but batching helps to reduce the overhead of tracking them individually and maintaining transaction semantics at each step. Instead, the aggregated batch data is persisted independently per processing stage and accessed as a unit during lookup. This allows individual batches 302 to be processed in parallel, in a pipeline, or in any other order, enabling ACID2.0 semantics. Furthermore, if a batch 302 fails during, processing, its partial state may not become visible until the hatch 302 is successfully replayed. Therefore, batch boundaries become the natural observation checkpoints at which the batch state can be guaranteed to be consistent under ACID2.0 semantics.

Figure 4:
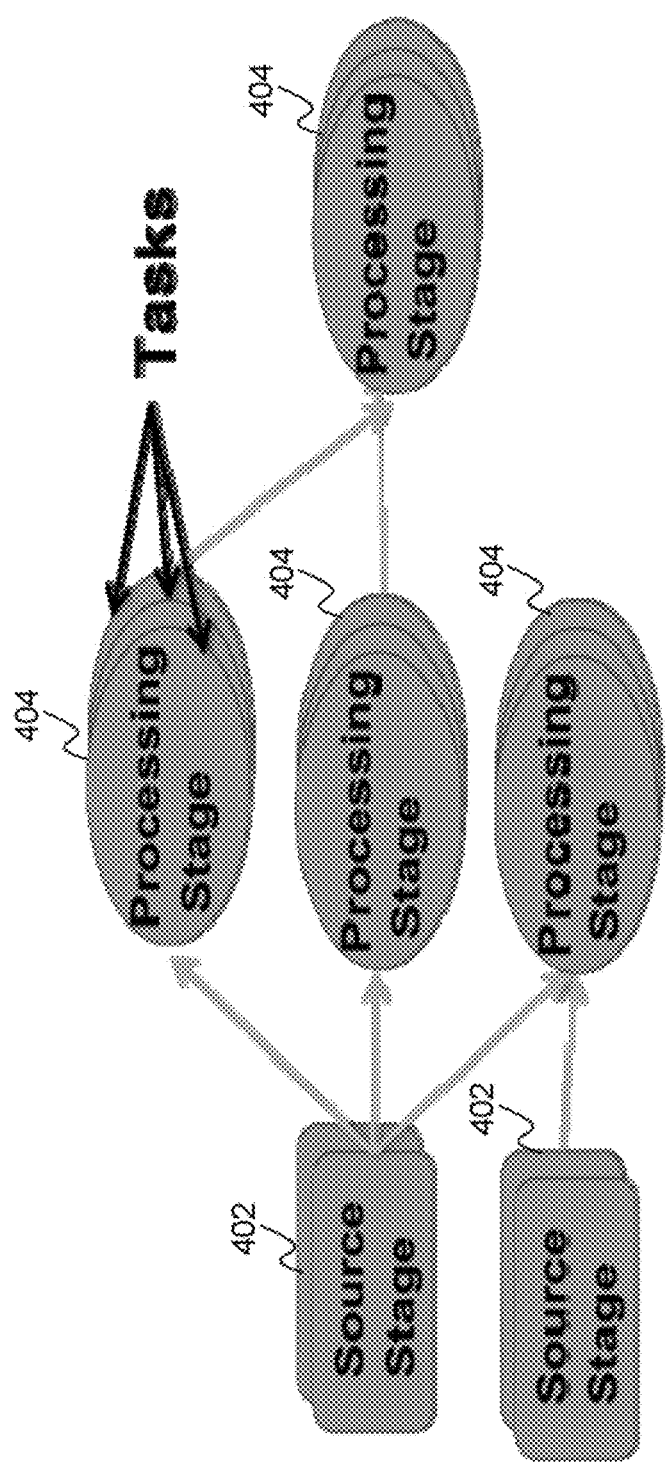
FIG. 4 is an exemplary topology of stream processing according to an embodiment of the present teaching.

FIG. 4 is an exemplary topology of stream processing according to an embodiment of the present teaching. In this example, Storm is used as the stream processing container to describe topology and stages in stream processing. Storm is a free and open source distributed real time computation system, which provides mechanisms to define, deploy, and debug a streaming application. It is understood that any other suitable real time online stream processing system known in the art may be applied in the present teaching. In this example, the application is expressed as a set of processing stages connected in a directed, acyclic graph (DAG) topology as shown in FIG. 4. The stage referred herein may be a logical processing node in the overall topology of a stream processing graph. The stages include source stages 402, which capture events from external sources, and processing stages 404, which process stream of events and produce stream of events. Each processing stage may internally support multiple threads of execution, i.e., tasks, and communicate with other stages via batches of events. Tasks may be physically distributed across a cluster for load balancing. In Storm terminology, processing stages are divided into source stages 402 called "spouts" and processing stages 404 called "bolts." in this example, each source stage 402 (spout) is responsible for the assignment of batch-ids to events, while each processing stage 404 (bolt) is responsible for collecting, processing, and emitting new events corresponding to each batch of events. In other words, each logical stream processing stage is implemented as a set of tasks all of which operate in parallel to take on the event processing load. These tasks may be assigned to execute on different physical hosts within the stream processing system. The tasks communicate with each other across stages on a pairwise basis to send stream events as well as control signals such as end-of-batch signal. The tasks belonging to the same stage also synchronize between each other to signify the completion of a batch of events on that stage.

Figure 5:
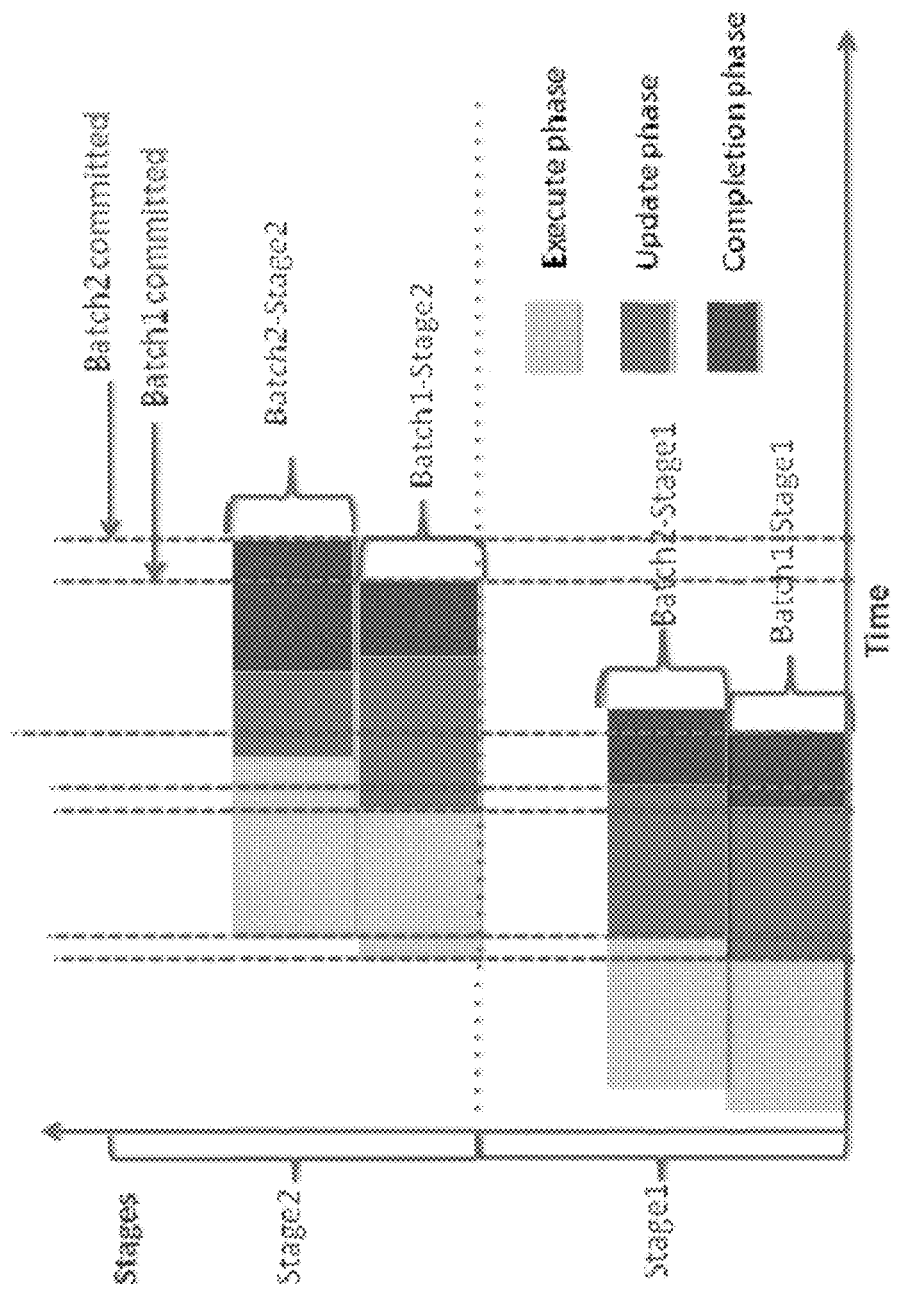
FIG. 5 is an exemplary diagram of phased parallel event processing among stages in stream processing according to an embodiment of the present teaching.

FIG. 5 is an exemplary diagram of phased parallel event processing among stages in stream processing according to an embodiment of the present teaching. Storm automatically coordinates among adjacent tasks for recognizing batch start and end events reliably. This divides the execution of a task into three distinct phases named execution-phase, update-phase, and completion-phase as shown in FIG. 5. In this example, a fresh execution-phase of a task may be triggered at the start of a new hatch of events. Each event then may be processed upon arrival, and its result may be forwarded to next stage(s) either immediately or after the entire batch has been processed depending on the business logic of the task. The update-phase then may get triggered when the task has processed all events of a batch received at that task. The task may perform batch-level final processing and then notify batch completion event to subsequent stages. The completion-phase may be simply the time taken to synchronize batch completion events across all parallel tasks of a logical stage and identifies the true logical completion of a batch at that stage. Storm allows for multiple levels of parallelism to be exploited during stream processing—across spouts and bolts and across multiple tasks within each node—because the entire topology operates asynchronously. Batch processing may create potential synchronization points and application controlled dependencies that may affect that parallelism. But, in return, it allows using ACID2.0 semantics over batches.

In FIG. 5, different batches may operate entirely independently and in an overlapped manner. Typically, for time-series batches this happens when a batch is replayed due to failure. Looking across stages for the same batch, in this example, the execution-phase of Stage 2 starts only during the update-phase of Stage 1. This shows that end-of-batch synchronization is used between these stages. It is understood that execute-execute parallelism may be also achieved for the same batch across stages. Also note that the update-phases of the two stages are sequentialized. This may be the only synchronization that is mandatory in the batched execution model because the end of update-phase of one stage is signaled as the batch-finish event for initiating the update phase of the next stage. That is, the update-phase of one stage may always be pipelined with the update-phase of the next stage. Moreover, the completion-phase may synchronize all tasks of a stage and provide strict ordering guarantee, if needed, among stages operating on the same batch. This synchronization may be achieved by the state managing module 108 as described below in detail.

Figure 6:
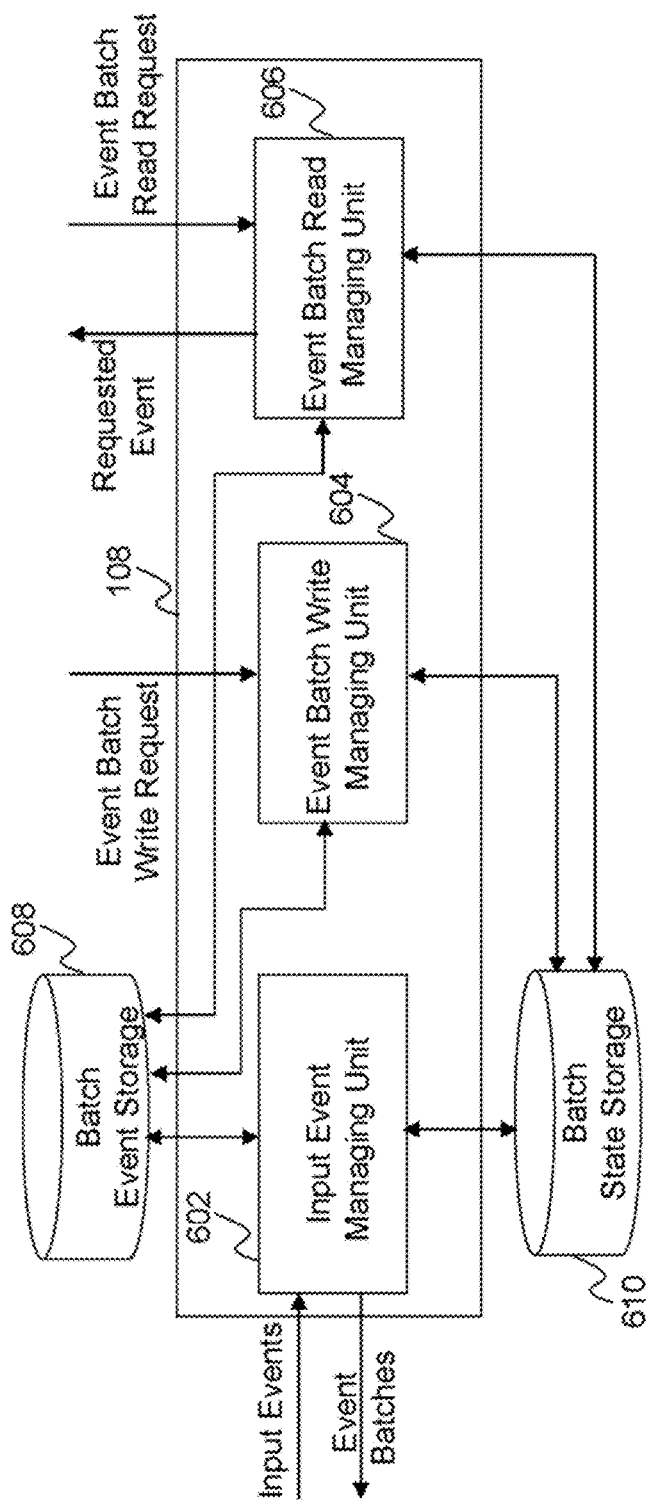
FIG. 6 is an exemplary functional block diagram of the system for event state management shown in FIG. 1 according to an embodiment of the present teaching.

FIG. 6 is an exemplary functional block, diagram of the system for event state management shown in FIG. 1 according to an embodiment of the present teaching. The event state managing system 102 includes the state managing module 108 having an input event managing unit 602, an event batch write managing unit 604, and an event batch read managing unit 606. As mentioned before with respect to FIG. 1, the event state managing system 102 may further include persistent storages 110 such as two separate storages: a batch event storage 608 and a batch state storage 610 in this example. It is understood that, in other examples, a single persistent storage may be used for storing both batch event data and state. In this example, the event state managing system 102 may be deployed on each of the physical nodes of a cluster for distributed stream processing.

The input event managing unit 602 in this example is configured to create a batch of events from the input events received by the online or offline processing system. In Storm, the input event managing unit 602 may be implemented in spouts. As shown before in FIG. 3, the input event managing unit 602 is capable of partitioning input events stream into multiple event batches over time. The duration of a batch may be decided based on near real-time requirements, e.g., from a few seconds to a few minutes, it is understood that events may be still processed individually as they arrive, but batching helps to reduce the overhead of tracking them individually and maintaining transaction semantics at each step. Instead, the aggregated batch data is persisted independently per processing stage and accessed as a unit during lookup. In addition to creating a new batch, the input event managing unit 602 is also configured to store the batch of events in a persistent storage, e.g., the batch event storage 608. The persistent storage may be any suitable storage known in the art, such as but not limited to any non-volatile storage including a hard drive or flash memory.

In one example, the batches of events may be stored in HBase, which is the HADOOP database, a distributed, scalable, big data store. FIG. 7 shows an example of the HBase table structure for this purpose. In this example, a row in the table corresponds to all the events persisted for a given batch and task. Each column is a single event or an array of events that are issued simultaneously. This organization allows parallel, independent read-writes from each task. In the event of failure of a batch anywhere in the topology, the whole batch may be replayed by reading that hatch of events from persistent storage for each of the tasks. Garbage collection process may be used to remove input events for successfully processed (committed) batches.

Figure 8:
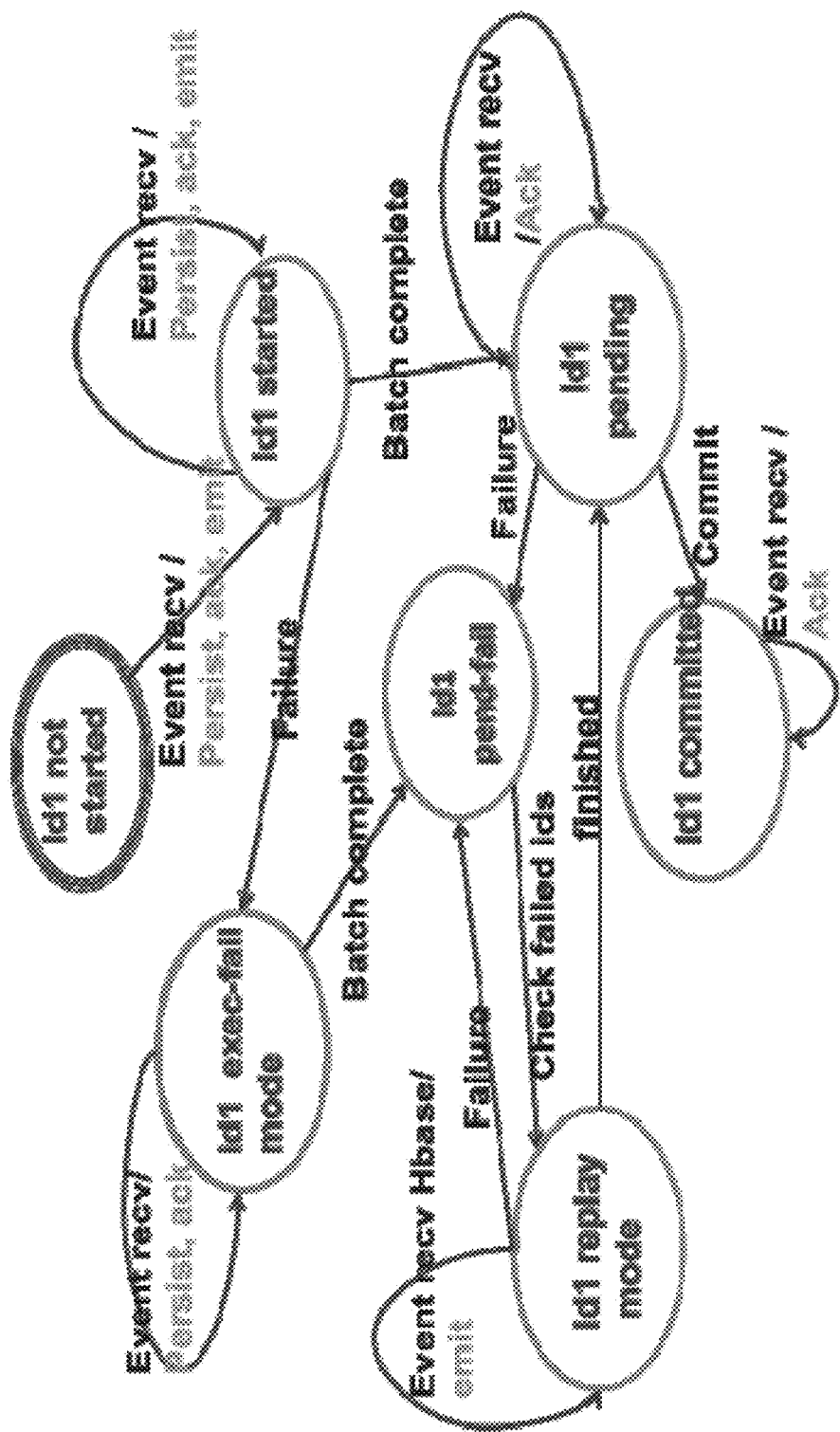
FIG. 8 is an exemplary transition diagram of batch state in a source stage according to an embodiment of the present teaching.

Referring back to FIG. 6, the input event managing unit 602 in this example may also keep track of the state associated with each batch that has been created and is to be processed in each stage of stream processing. As mentioned before, the state may be any piece of information that needs to be saved in persistent store, e.g., the batch state storage 610 in this example, aggregated over time, and referred back later during the course of stream processing. FIG. 8 is an exemplary transition diagram of batch state in a source stage according to an embodiment of the present teaching, in this example, the state may be maintained in the batch state storage 610, e.g., ZooKeeper, separate from the batch event storage 608, e.g., HBase, to allow better coordination among multiple tasks. ZooKeeper is a centralized service for maintaining configuration information, naming, providing distributed synchronization, and providing group services. A new batch is started in the "started" state. Each event is fetched from an external source, tagged with the current batch-id, persisted in HBase and then acknowledged to the external source immediately. After that, the event is emitted to the next processing stage for execution. Once, a batch boundary is reached a batch-finish signal is generated by the task and the batch state changes to "pending." At this point, this batch is waiting for the entire topology to finish before it can be marked as "committed." However, the spout may start processing the next batch of events immediately. In case of any failure in processing during (or after) the arrival of batch events, the spout is notified of the failure (for replay), and the batch state is transitioned to "exec-fail" (or "pend-fail") state. In "exec-fail" state input events may be persisted and acknowledged but not sent for down-stream processing. Finally, on reaching batch boundaries, any batches that have been reported as failed (in "pend-fail" state) may be replayed from HBase to down-stream tasks.

Referring back to FIG. 6, the event batch write managing unit 604 in this example is configured to update the state associated with the batch based on results of processing the batch in the processing stages. In one example, the state includes one or more sub-states (meta-states) corresponding to each processing stage, and each sub-state is updated based on a result of processing the batch in the corresponding stage. The state, including all the sub-states, are recorded by the event batch write managing unit 604 and stored in the batch state storage 610. Also, data associated with the sub-states is stored in the batch event storage 608. In the example of Storm, each processing bolt may be allowed to create its own batch-level data (typically, key-value pairs) that is also stored in the batch event storage 608, e.g., HBase, for future reference. To achieve low latency, the data may be accumulated in memory during the execute-phase of a task and then flushed to the batch event storage 608 during update-phase. A typical example is to compute an aggregate unique key count (e.g. word count) of a batch of events. In one example, the event hatch write managing unit 604 provides a user-visible write application programming interface (API) as shown below:

void write (store_name, key, value);

The write API identifies the stage-name and batch-id information from context in which it is called. For consistency, the application may ensure that the same key is not written by two parallel tasks operating on the same batch. This makes the combination of dimensions (i.e. storage-name, key, stage-name, batch-id, batch-retry-count) written by a task to be unique.

FIG. 9 is an exemplary structure of a batch event data table according to an embodiment of the present teaching. In this example, a stream processing topology has three stages and two batches. Data for different stages (bolts) is stored in different column families. Data for multiple batches for a given bolt is stored in different columns. This helps in keeping the data immutable after batch completion or commit. Also data for a batch may be computed independently and in any order in case of batch replay.

Figure 10:
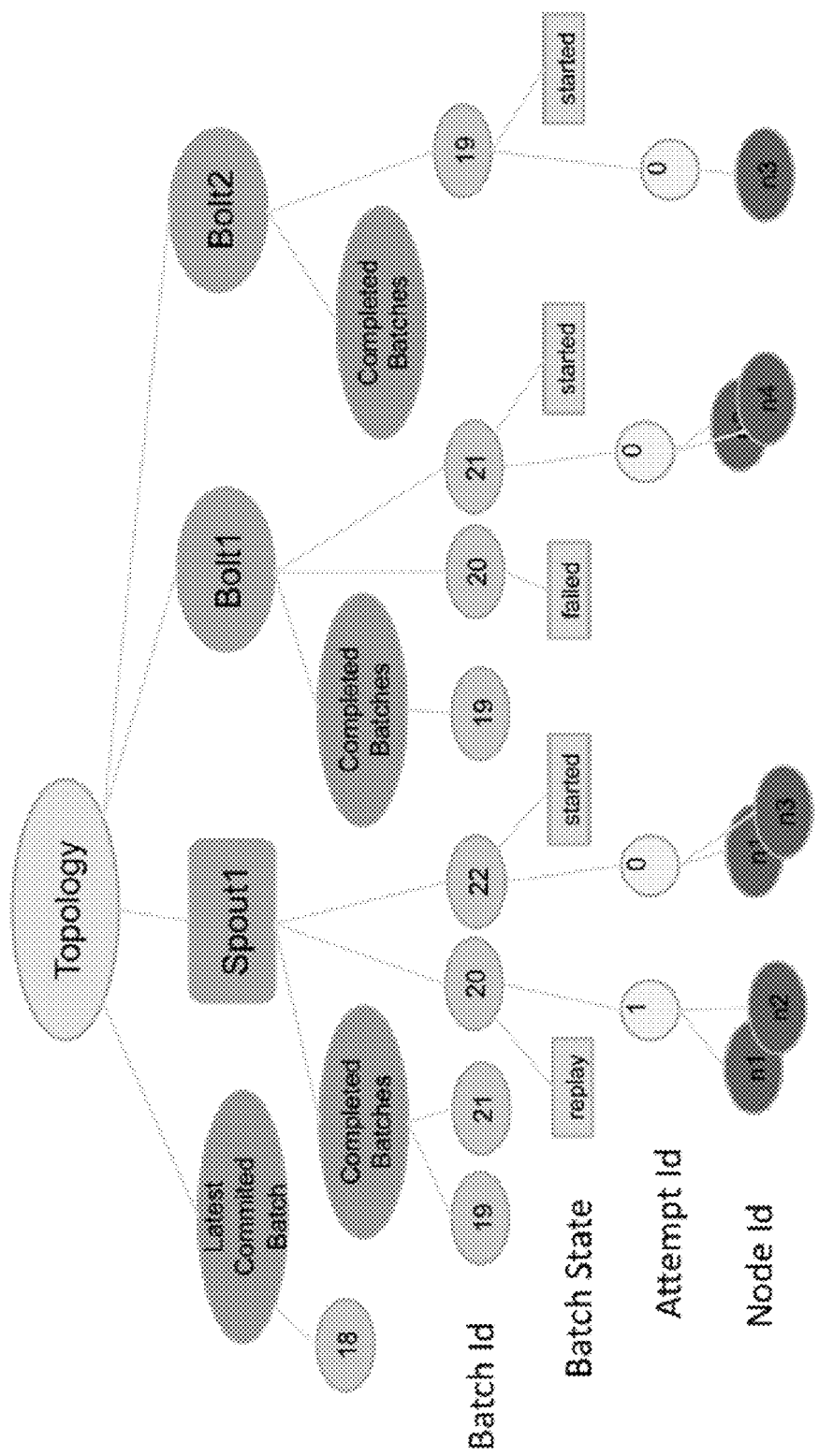
FIG. 10 is an exemplary depiction of a sub-state hierarchy according to an embodiment of the present teaching.

In one example, the sub-state for all processing stages within a topology may be maintained as a ZooKeeper state hierarchy as shown in FIG. 10. Under the state hierarchy maintained for a topology, each spout or bolt maintains the state for its currently active batches as well as a list of completed batches. Each active batch keeps track of the current retry attempt being made by the tasks within that processing stage. Once all the tasks of a stage finish a batch attempt, that batch is promoted to "completed" state for that stage. Once all the stages complete a batch, that batch is promoted to "committed" state. Any batch failure before commit may reset its state to "failed" and create a fresh retry attempt to be initiated from the spout. In FIG. 10, the state hierarchy shows five batches having batch id 18, 19, 20, 21, and 22, and three stages: spout 1, bolt 1, and bolt 2. The state and/or sub-states associated with each batch are recorded. For example, the state of batch 18 is recorded as the latest committed hatch because all the stages have completed processing this batch. For those batches that have not been committed yet, sub-states associated with each batch are recorded on a per stage basis. For example, batches 19 and 21 have a sub-state of "complete" in spout 1 as spout 1 has finished processing those batches. Batch 22 has the sub-state "started" in spout 1 as spout 1 has just started retrieving a fresh batch of input events. Batch 20, instead, has a "replay" sub-state in spout 1, and its number of attempts to replay may be also recorded. Optionally, the physical nodes of a cluster that process batch 20 may be also recorded. Similarly, the sub-states of each uncommitted batch in each processing stage, e.g., bolt 1 and bolt 2, are also recorded in this example. For example, batch 20 has a sub-state of "failed" in bolt 1, indicating a processing failure without being replayed yet. As described above, all the data information related to state/sub-states of each batch may be dynamically updated and recorded in the form of, for example, tables shown in FIG. 9, in a persistent storage, e.g., the batch event storage 608, for future reference.

Referring back to FIG. 6, the event batch read managing unit 606 in this example allows events to be read only when the batch is either complete or committed in order to maintain ACID 2.0 consistency. In one example, the event batch read managing unit 606 may be implemented as a user-visible read API as shown below:

value[ ] read (store_name, key, stage-name, list<batch-ids>, completionPercentage, timeout).

Each read request for a window of batch-ids in a stage consults the corresponding sub-state in the batch state storage 610, e.g., ZooKeeper, before reading data from the batch event storage 608, e.g., HBase. Event data may be read from HBase for a batch only if it is in a completed or committed state. Given a window of batch-ids to be read, a tradeoff may be made between the availability of results versus overall latency using additional parameters. The completion-percentage parameter (default 100%) provides minimum completeness guarantee of requested batches. The read API may block until the fraction of batches reporting as completed or committed matches the desired completion percentage. The timeout parameter (default none) may provide guaranteed latency. If timeout is specified, the API returns with whatever fraction of batches that have completed upon expiration of timeout. Note that partial completion of an individual batch may not be exposed; only partial completion of a window of batches may be traded off against latency. Therefore, this API guarantees write-to-read synchronization at a batch-level ensuring consistent processing.

Figure 11:
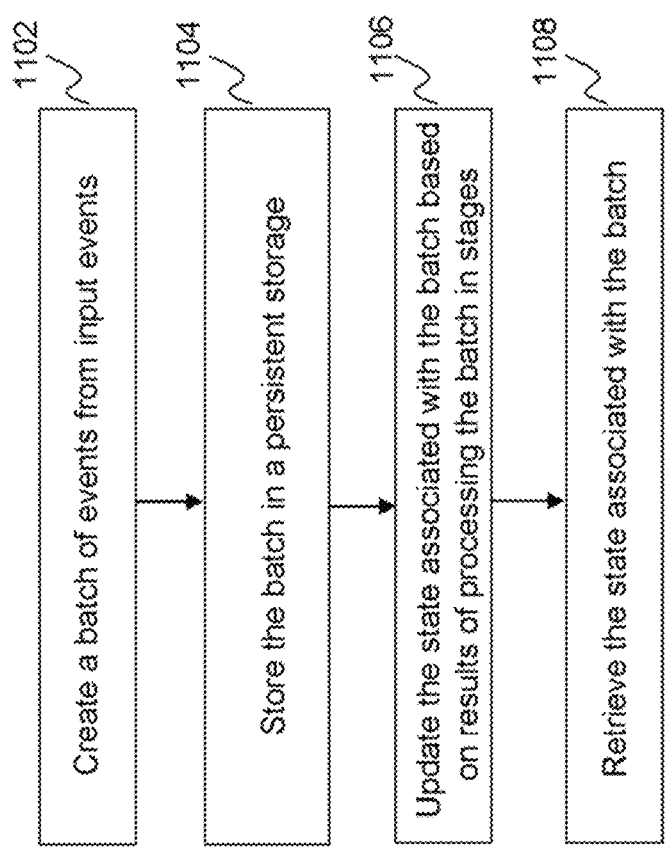
FIG. 11 is a flowchart illustrating an exemplary process of event state management according to an embodiment of the present teaching.

FIG. 11 is a flowchart illustrating an exemplary process of event state management according to an embodiment of the present teaching. It will be described with reference to the above figures. However, any suitable module or unit may be employed. Beginning at step 1102, a batch of events is created from the input events. The batch is associated with a state and is to be processed in one or more stages of an online processing system and/or an offline processing system. As described above, this may be performed by the input event managing unit 602 of the state managing module 108. At step 1104, processing may continue where the batch of events is stored in a persistent storage, e.g., the batch event storage 608. In the event of failure of a batch anywhere in the topology, the whole batch can be replayed by reading that batch of events from persistent storage for each of the tasks. As described above, this may be performed by the input event managing unit 602 in conjunction with the batch event storage 608. At step 1106, the state associated with the batch is updated based on results of processing the batch in the stages. For example, if the results indicate a failure of processing an event in the batch, the state is updated to "failed," the batch of events is retrieved from the persistent storage, and the state is further updated to "replayed." The state associated with each batch may include sub-states that correspond to the processing stages, and each sub-state may be updated based on the result of processing the batch in the corresponding processing stage. Each sub-state may be updated only when all of the events in the batch have been processed in the corresponding processing stage. In one example, each sub-state is updated to "complete" once the batch has been processed in the corresponding stage. In another example, the state of the batch is updated to "committed" once the batch has been processed in all of the stages. Additionally, batch event data is stored based on the result of processing each batch in the processing stages. In one example, the state associated with the batch may be stored in another persistent storage separate from the persistent storage for storing the batch of events. As described above, this may be performed by the event batch write managing unit 604 in conjunction with the batch state storage 610. Moving to step 1108, the state, including sub-states, is retrieved. Only those batch event data for a processing stage are allowed to be retrieved whose sub-state is completed or committed. In one example, the read request for batch event data for a processing stage blocks until another write request for the same batch and processing stage writes the event data. In another example, the read request is considered as failed and it is retried after some time. In this example, the read request is returned successfully with batch event data only when the sub-state for this batch at this processing stage is identified to be completed or committed. As described above, this may be performed by the event batch read managing unit 606 in conjunction with the batch state storage 610 and batch event storage 608.

Figure 12:
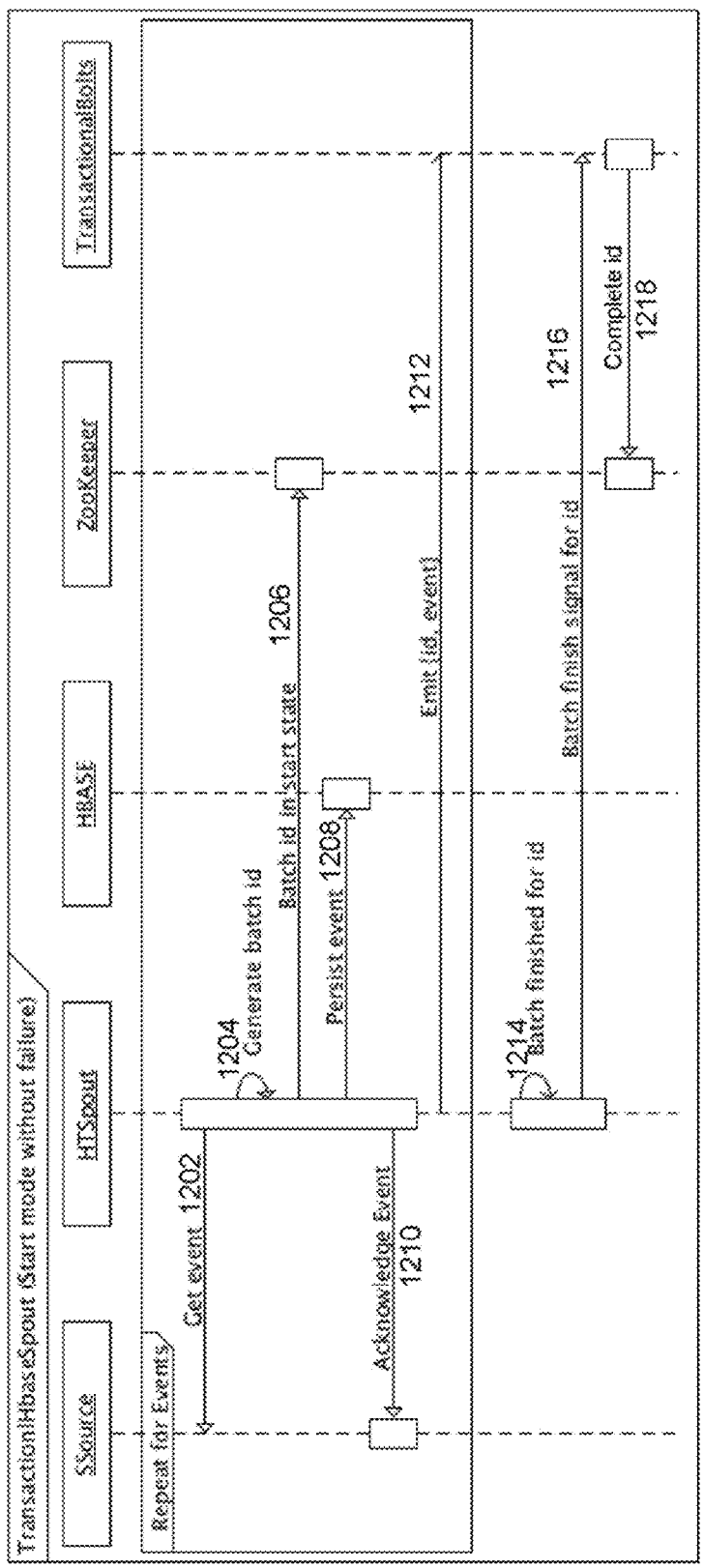
FIG. 12 is an exemplary sequence diagram illustrating a process of event state management in a normal scenario according to an embodiment of the present teaching.

FIG. 12 is an exemplary sequence diagram illustrating a process of event state management in a normal scenario according to an embodiment of the present teaching in operation, at step 1202, a source stage (HTSpout) gets a first event to be processed from an external source (SSource). At step 1204, the source stage (HTSpout) creates a new batch of events and generates a batch id for it. The state associated with the newly created batch is then updated to "started" and recorded in a persistent storage (ZooKeeper at step 1206. The received event is persisted in another persistent storage (HBASE) at step 1208. The source stage (HTSpout) then acknowledges the receiving of the event with the external source (SSource) at step 1210. The event is then emitted to the processing stages (TransactionalBolts) with its batch id at step 1212. Steps 1202-1212 are repeated over time. Based on the predetermined duration of each batch, at step 1214, once the source stage (HSpout) determines that the received events have reached the batch boundary, it sends a batch finish signal to the processing stages (TransactionalBolts) at step 1216. It is understood that events may be still processed individually as they arrive at the processing stages (TransactionalBolts), but batching helps to reduce the overhead of tracking them individually and maintaining transaction semantics at each stage. Eventually, at step 1218, each of the processing stages sends the batch "complete" signal to the persistent storage (ZooKeeper). Once all the processing stages have complete processing the batch, the state associated with the batch is updated to "committed," which is recorded in the persistent storage (ZooKeeper).

Figure 13:
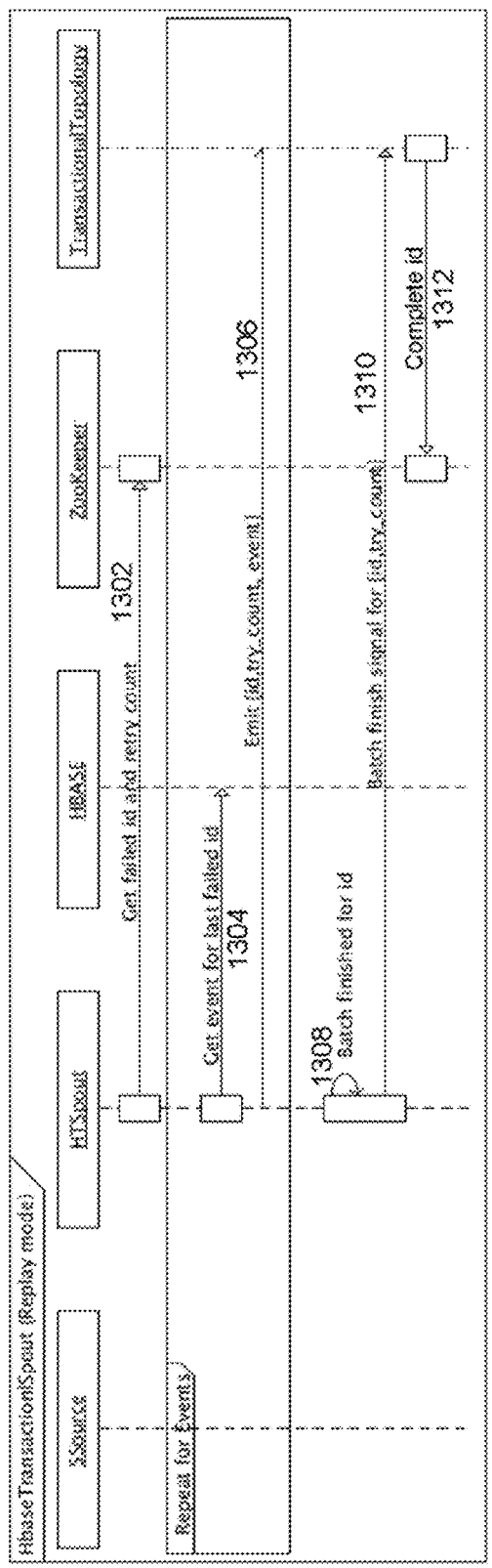
FIG. 13 is an exemplary sequence diagram illustrating a process of event state management in a failure scenario according to an embodiment of the present teaching.

FIG. 13 is an exemplary sequence diagram illustrating a process of event state management in a failure scenario according to an embodiment of the present teaching. In operation, at step 1302, in response to a failure of processing in a batch in any of the processing stages (TransationalTopology), the source stage (HTSpout) gets the failed batch id, state, and retry count from the persistent storage (ZooKeeper). At step 1304, the source stage (HTSpout) gets the first event in the last failed batch from the other persistent storage (HBASE) where all the batches are persisted. The retrieved event is then emitted to the processing stages (TransationalTopology) for replay at step 1306. Steps 1304, 1306 are repeated over time until all the events in the failed batch have been retrieved and emitted to the processing stages (TransationalTopology) for replay. Based on the predetermined duration of each batch, once the source stage (HSpout) determines that the retrieved events have reached the batch boundary at step 1308, it sends a batch finish signal to the processing stages (TransactionalBolts) with the number of attempts to replay (try_count) at step 1310. Eventually, at step 1312, each of the processing stages sends the batch "complete" signal to the persistent storage (ZooKeeper). Once all the processing stages have complete processing the batch, the state associated with the batch is updated to "committed," which is recorded in the persistent storage (ZooKeeper).

Figure 14:
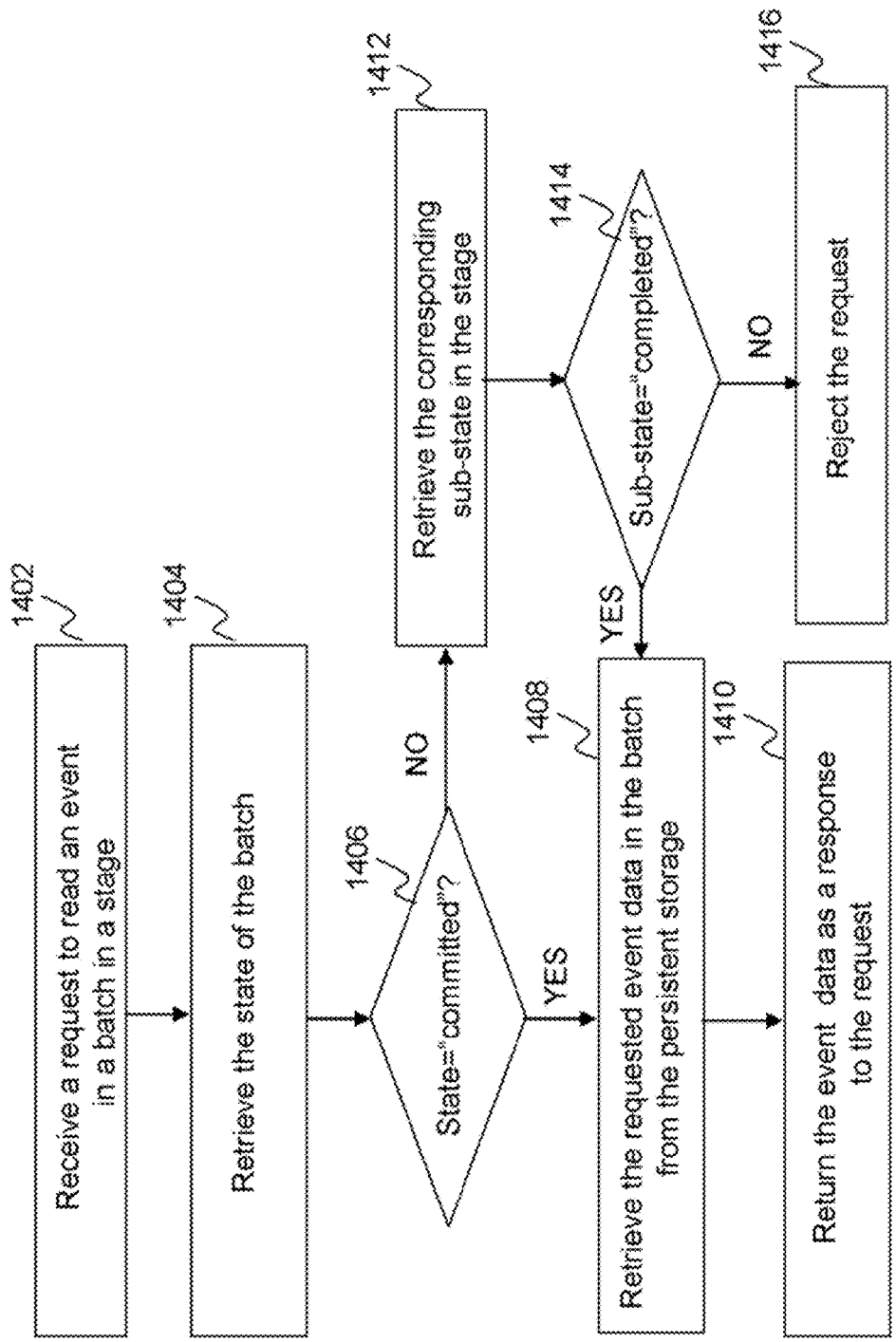
FIG. 14 is a flowchart illustrating another exemplary process of event state management according to an embodiment of the present teaching.

FIG. 14 is a flowchart illustrating another exemplary process of event state management according to an embodiment of the present teaching. As described above, this may be performed by the event batch read managing unit 606 of the state managing module 108; however, any suitable module or unit may be employed. Beginning at step 1402, a request to read an event of a batch in a processing stage is received. The request may be made by a user or a task in any of the processing stages. At step 1404, the state of the batch is retrieved for example, from the hatch state storage 610. Moving to step 1406, whether the current state is "committed" is determined. If the state has been updated to "committed", i.e., the batch has been processed by all the processing stages, the requested event in the batch is retrieved from the persistent storage, e.g., the batch event storage at step 1408 and returned as a response to the request at step 1410. However, if the state has not been updated to "committed" at step 1406, the process will move to step 1412, where the sub-state associated with the batch is retrieved for example, from the batch state storage 610, for the designated processing stage. At step 1414, whether the sub-state is "completed" is checked. If it is determined that the sub-state associated with the batch for the designated processing stage has been updated to "completed," i.e., the batch has been processed by this processing stage, the process will move to steps 1408, 1410. If it is determined that the sub-state associated with the batch has not been updated to "completed," then at step 1416, the request is rejected.

Preliminary experiments have been performed to show the performance of the method and system disclosed herein for event state management in stream processing. The experimental setup consists of a 10-node cluster that is co-hosting a 10-node HBase and HADOOP deployment, 5-node ZooKeeper quorum, and 3 to 9-node Storm cluster. In these experiments, Storm runs as an independent service and does not run on HADOOP-core. Storm cluster size is also changed in some of the experiments to test scalability issues. Storm-0.7.4, ZooKeeper-3.4.3_1, HADOOP-1.0.3 and HBase-0.92.1 are used for the tests. Physical machines are quad-core with 32 Gb memories and 1×500 Gb SATA disk and connected to 1 Gbps Ethernet card. 12 storm workers are setup in each machine with each worker using 2 Gb heap and 256K stack size per thread.

For realistic test results, a real-time trending product called Timesense is coded and tested on the experimental infrastructure. Timesense detects buzzing trends from search query logs and news headlines. Trends are detected based on the likelihood estimate of a search query as shown below. A query is broken into its n-grams, which is a sequence of consecutive words taken from the query. Probability of occurrence of n-grams over sliding time windows is used in likelihood estimation of the query. A smoothing factor (SF) is used in case the n-gram is not present in the designated time window.

$$LE(\text{query}) = \sum_{ngram} \log\left(\frac{\text{count}(ngram) + SF}{\text{total } ngram \text{ count} + (SF * \text{vocabulary count})}\right)$$

Figure 15:
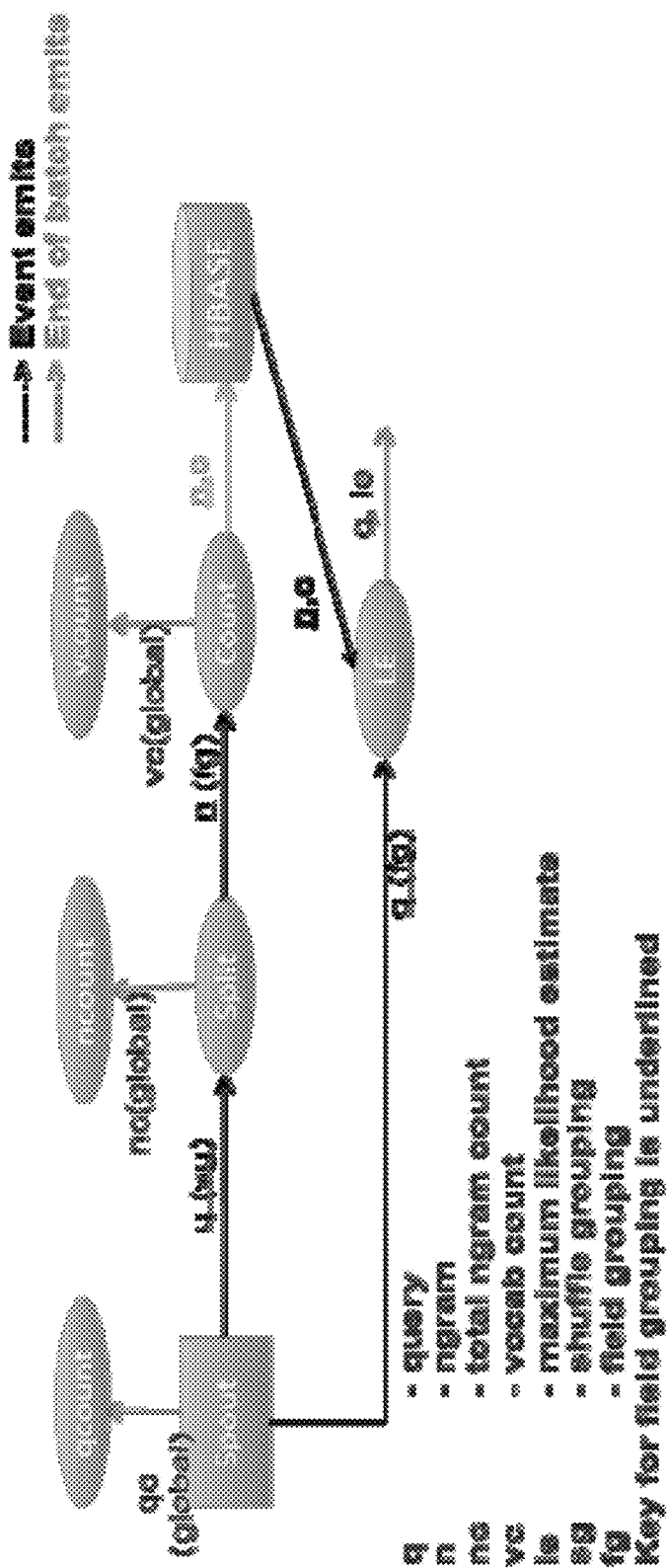
FIG. 15 is an exemplary topology for likelihood estimation in testing according to an embodiment of the present teaching.

A simple topology to implement likelihood calculation is shown in FIG. 15. In this topology, the spout pulls the search query from search log pipeline. Then, the split bolt generates n-grams from the search query. The count bolt aggregates n-gram count for a batch and writes n-gram and its count into HBase table. LE bolt calculates the likelihood of a query based on historical n-gram counts over a 15-minute time window. Total n-gram count and vocabulary count over each batch are also stored and read from HBase. The performance of the topology on a 3-node Storm cluster with 36 tasks per bolt is shown in Table 1. 1,500 events per second are used in the test to simulate expected production load. The latency of batch is the time elapsed from the start of a batch to the completion of likelihood estimation for all events of the batch. To have good HBase performance, a write buffer is used. For fault-tolerance guarantees, the buffer is flushed at the end of update phase.

TABLE 1

Performance of Simple Topology

| Batch length (sec) | Event rate/ sec | HBase write per batch | HBase write latency (ms) | HBase read per batch | HBase read latency (ms) | latency (sec) |
|---|---|---|---|---|---|---|
| 10 | 1500 | 10608 | 0.0220 | 26942 | 0.5726 | 15.348 |
| 30 | 1500 | 22272 | 0.0241 | 55920 | 0.3858 | 37.434 |
| 60 | 1500 | 35470 | 0.0255 | 87836 | 0.3547 | 70.836 |

Analysis of end-to-end latency of the simple topology in Table 1 shows that significant part of the latency is because of the synchronization between HBase reads and writes, particularly for small batch lengths. This is because the n-gram writes happening during the update-phase of the count bolt need to be read back immediately by the LE bolt running in parallel. However, the important point is that user does not have worry about this synchronization at all as it is automatically handled by the framework.

Figure 16:
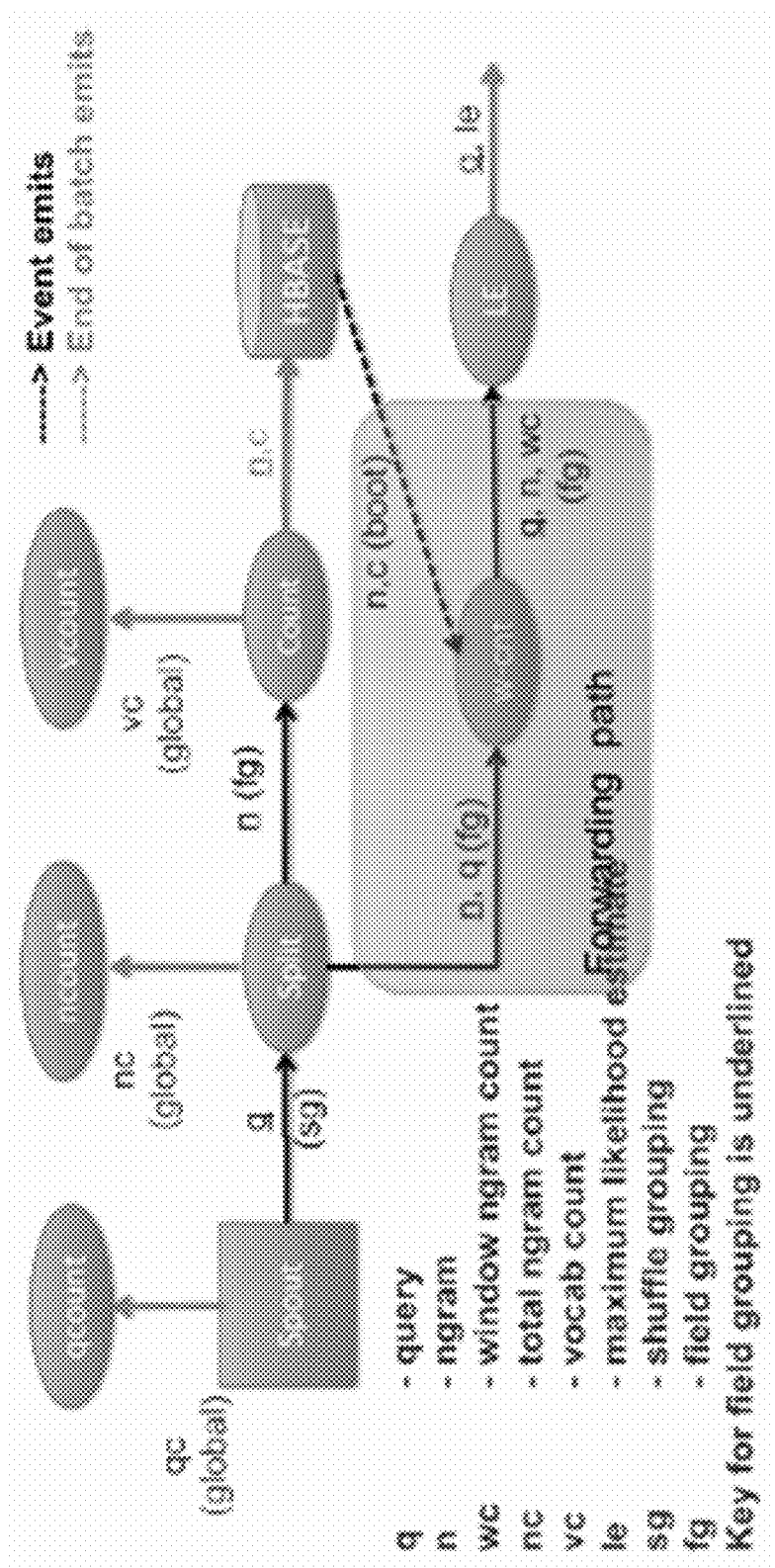
FIG. 16 is an exemplary topology for forwarding likelihood estimation in testing according to an embodiment of the present teaching.

Another topology which is optimized for latency is shown in FIG. 16, it is functionally equivalent to the simple topology of the previous section. But here, a new bolt w-cnt is introduced to calculate and forward n-gram counts to LE bolt as soon as possible. Effectively, it pre-fetches the n-gram counts for previous batches from HBase while accumulating the current batch counts in its execute-phase. The performance of the topology on a 3-node cluster is shown in Table 2, which shows no latency degradation.

TABLE 2

Performance of Forwarding Topology

| Batch length (sec) | Event rate/sec | HBase write per batch | HBase write latency (ms) | HBase read per batch | HBase read latency (ms) | latency (sec) |
|---|---|---|---|---|---|---|
| 10 | 1500 | 10605 | 0.0254 | 10605 | 0.6576 | 10.095 |
| 30 | 1500 | 22264 | 0.0205 | 22264 | 0.4565 | 30.159 |
| 60 | 1500 | 35305 | 0.0232 | 35305 | 0.4589 | 60.282 |

The above tests show that the framework enables such optimizations without worrying about the correctness of data synchronizations within the application. It provides an easy to use and consistent programming model to work with state.

Utilization of CPU, memory and network of the likelihood estimation algorithm at production load is very low. Hence, additional tests were done to measure the effect of increased processing load. The same forwarding topology of FIG. 16 is used for this test running on a 3-node Storm cluster with total 36 logical tasks per bolt. Test results are shown in Table 3. Results show that the infrastructure is suitable for high-throughput processing as each node can take on average 10,000 events per second, and the 3-node cluster can take overall 30,000 events per second with less than 5% overhead in latency.

TABLE 3

Effect of Increasing Load on 3-Node Cluster

| Batch length (sec) | Event rate/ sec | HBase write per batch | HBase write latency (ms) | HBase read per batch | HBase read latency (ms) | latency (sec) |
|---|---|---|---|---|---|---|
| 60 | 15000 | 143286 | 0.0864 | 143286 | 1.1700 | 62 |
| 60 | 30000 | 225608 | 0.1092 | 225608 | 1.3740 | 63 |

To measure the effect of system scaling, the same topology is experimented on 3, 6 and 9-node storm cluster with 60-second batch size. The number of tasks per bolt is increased proportionally with additional hardware. Effect of increasing duster size is shown is Table 4. Results show that the cluster throughput scales linearly with the increase of number of nodes. 9-node cluster can sustain more than 90,000 events per second without a bottleneck. HBase latency is slightly degraded at such high throughput.

TABLE 4

Cluster Scaling Effect on Performance

| Cluster | Event rate/sec | HBase write per batch | HBase write latency(ms) | HBase read per batch | HBase read latency (ms) | latency (sec) |
|---|---|---|---|---|---|---|
| 3 node (36 tasks) | 30000 | 225608 | 0.1092 | 225607 | 1.3740 | 63 |
| 6 node (72 tasks) | 60722 | 327523 | 0.4599 | 327523 | 2.849 | 64 |
| 9 node (108 tasks) | 92790 | 475404 | 0.6693 | 475404 | 8.8273 | 70 |

Figure 17:
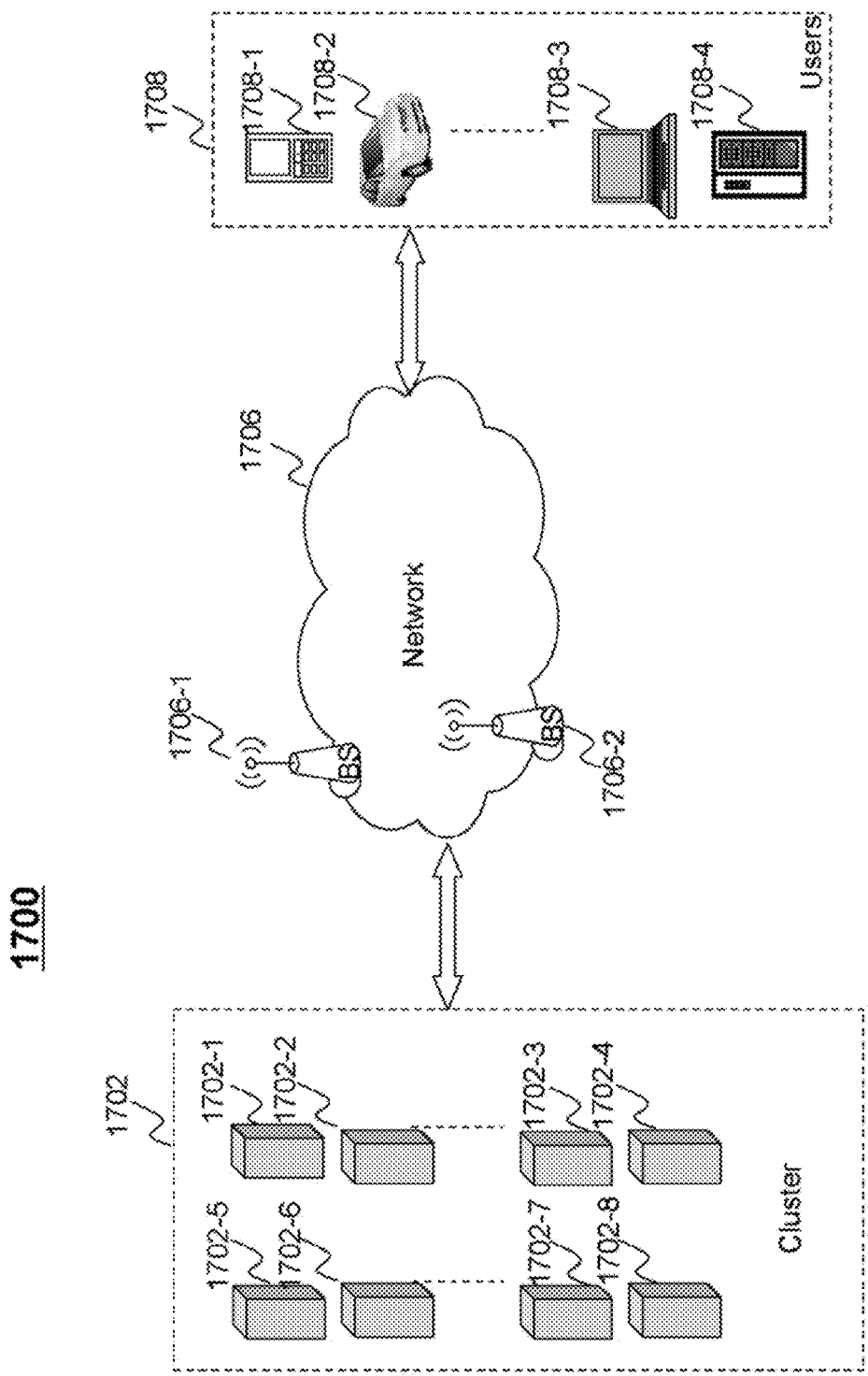
FIG. 17 is an exemplary network environment in which the system for event state management can be implemented according to an embodiment of the present teaching.

FIG. 17 is an exemplary network environment in which the system for event state management in stream processing can be implemented according to an embodiment of the present teaching. In this example, the exemplary network environment 1700 includes a duster 1702, a network 1706, and users 1708. The network 1706 may be a single network or a combination of different networks. For example, the network 1706 may be a local area network (LAN), a wide area network (WAN), a public network, a private network, a proprietary network, a Public Telephone Switched Network (PSTN), the Internet, a wireless network, a virtual network, or any combination thereof. The network 1706 may also include various network access points, e.g., wired or wireless access points such as base stations or Internet exchange points 1706-1, . . . , 1706-2, through which a data source may connect to the network 806 in order to transmit information via the network 1706.

The cluster 1702 in which event state management in stream processing to be performed may include a plurality of nodes 1702-1, 1702-2 . . . 1702-7, 1702-8, which communicate through the network 1706 or through an internal network (not shown). Each node 1702-1, 1702-2, . . . 1702-7, 1702-8 may be an autonomous physical machine, such as servers, workstations, desktop or laptop computers, tablets, smart phones, televisions, game consoles, or any other suitable machines. In some examples, some or all of the nodes 1702-1, 1702-2 . . . 1702-7, 1702-8 may include software installed on parallel virtual machines implemented by either software emulation or hardware virtualization. The cluster 1702 may be a set of machines owned by one entity, e.g., an enterprise, and maintained as a server farm or server cluster where the servers are mounted on racks in a server room or data center. The cluster 1702 may also a collection of machines owned by different entities and that are physically separate from each other at a distance. As mentioned before, in this example, the event state managing system 102 may be implemented on each node 1702-1, 1702-2 . . . 1702-7, 1702-8 of the cluster 1702.

Users 1708 may be of different types such as users connected to the network 1706 via desktop connections 1708-4, users connecting to the network 1706 via wireless connections such as through a laptop 1708-3, a handheld device 1708-1, or a built-in device in a motor vehicle 1708-2. A user 1708 may be a network administrator, operator, developer, or customer of the cluster 1702 and may access to the cluster 1702 by sending a request to the cluster 1702 via the network 1706 and receiving a result from the cluster 1702 through the network 1706. It is understood that the request may be served from a different close-by cluster. The results of the streaming computation may be pushed to the user directly or kept in the event data store from where they can be served.

To implement the present teaching, computer hardware platforms may be used as the hardware platform(s) for one or more of the elements described herein. The hardware elements, operating systems, and programming languages of such computers are conventional in nature, and it is presumed that those skilled in the art are adequately familiar therewith to adapt those technologies to implement the processing essentially as described herein. A computer with user interface elements may be used to implement a personal computer (PC) or other type of work station or terminal device, although a computer may also act as a server if appropriately programmed. It is believed that those skilled in the art are familiar with the structure, programming, and general operation of such computer equipment and as a result the drawings should be self-explanatory.

Figure 18:
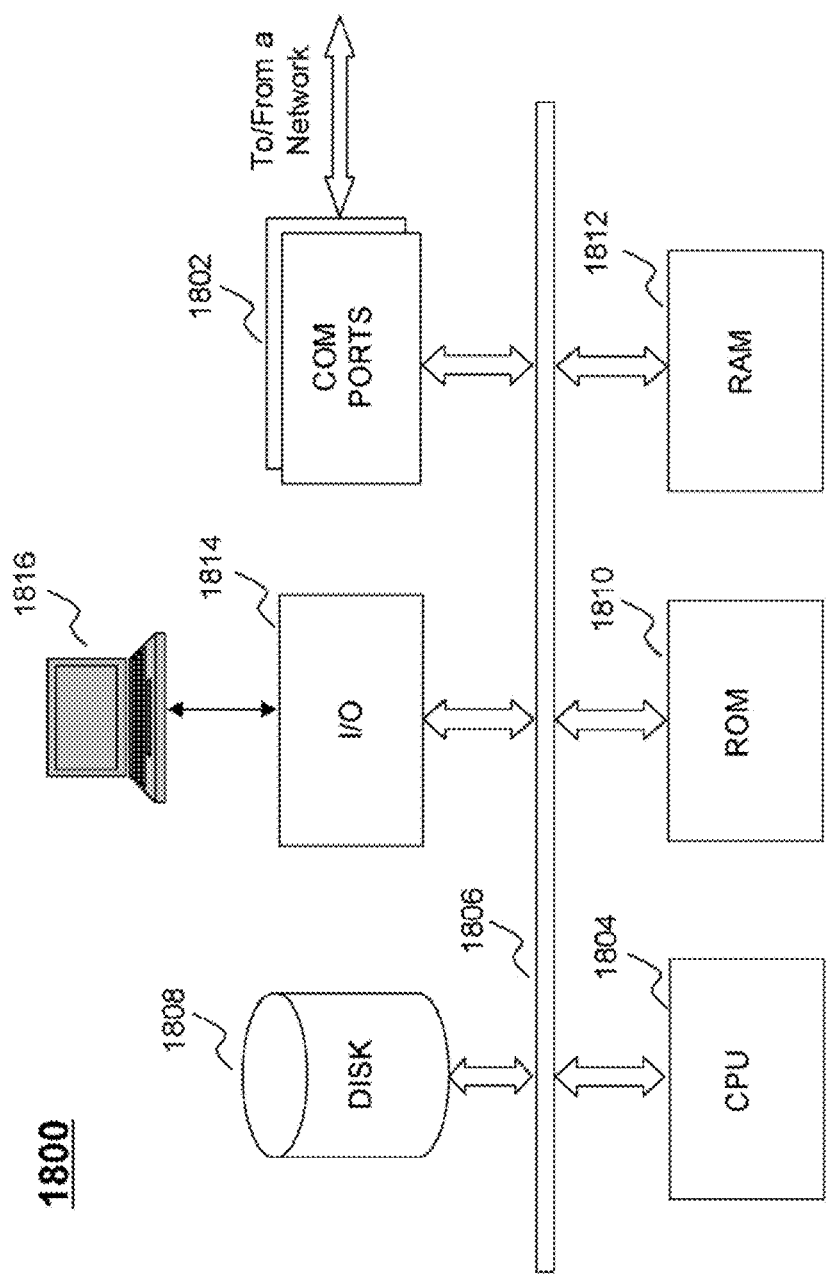
FIG. 18 depicts a general computer architecture on which the present teaching can be implemented.

FIG. 18 depicts a general computer architecture on which the present teaching can be implemented and has a functional block diagram illustration of a computer hardware platform that includes user interface elements. The computer may be a general-purpose computer or a special purpose computer. This computer 1800 can be used to implement any components of the dynamic control architecture as described herein Different components of the system, e.g. as depicted in FIGS. 1 and 6, can all be implemented on one or more computers such as computer 1800, via its hardware, software program, firmware, or a combination thereof. Although only one such computer is shown, for convenience, the computer functions relating to event state management may be implemented in a distributed fashion on a number of similar platforms, to distribute the processing load.

The computer 1800, for example, includes COM ports 1802 connected to and from a network connected thereto to facilitate data communications. The computer 1800 also includes a central processing unit (CPU) 1804, in the form of one or more processors, for executing program instructions. The exemplary computer platform includes an internal communication bus 1806, program storage and data storage of different forms, e.g., disk 1808, read only memory (ROM) 1810, or random access memory (RAM) 1812, for various data files to be processed and/or communicated by the computer, as well as possibly program instructions to be executed by the CPU. The computer 1800 also includes an I/O component 1814, supporting input/output flows between the computer and other components therein such as user interface elements 1816. The computer 1800 may also receive programming and data via network communications.

Hence, aspects of the method of event state management in stream processing, as outlined above, may be embodied in programming. Program aspects of the technology may be thought of as "products" or "articles of manufacture" typically in the form of executable code and/or associated data that is carried on or embodied in a type of machine readable medium. Tangible non-transitory "storage" type media include any or all of the memory or other storage for the computers, processors or the like, or associated modules thereof, such as various semiconductor memories, tape drives, disk drives and the like, which may provide storage at any time for the software programming.

All or portions of the software may at times be communicated through a network such as the Internet or various other telecommunication networks. Such communications, for example, may enable loading of the software from one computer or processor into another. Thus, another type of media that may bear the software elements includes optical, electrical, and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer(s) or the like, which may be used to implement the system or any of its components as shown in the drawings. Volatile storage media include dynamic memory, such as a main memory of such a computer platform. Tangible transmission media include coaxial cables; copper wire and fiber optics, including the wires that form a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

Those skilled in the art will recognize that the present teachings are amenable to a variety of modifications and/or enhancements. For example, although the implementation of various components described above may be embodied in a hardware device, it can also be implemented as a software only solution—e.g., an installation on an existing server. In addition, the units of the host and the client nodes as disclosed herein can be implemented as a firmware, firmware/software combination, firmware/hardware combination, or a hardware/firmware/software combination.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

We claim:

1. A method implemented on at least one machine each having at least one processor, storage, and a communication platform connected to a network for event state management in stream processing, the method comprising:
   creating a batch of events based on a plurality of events inputted from an external source, wherein the batch of events is associated with a state of processing the batch of events and is to be processed in one or more stages;
   storing the batch of events in a persistent storage;
   processing the batch of events in the one or more stages by at least one of an online event processing system and an offline event process system;
   updating the state associated with the batch of events when the processing of the one or more stages is completed, wherein the state associated with the batch of events comprises one or more sub-states corresponding to the one or more stages;
   updating each sub-state of the one or more sub-states to "complete" once the batch of events has been processed in the corresponding stage of the one or more stages; and
   updating the state associated with the batch of events to "committed" once the batch of events has been processed in all of the one or more stages.

2. The method of claim 1, further comprising:
   if processing of an event in the batch of events fails, updating the state associated with the batch of events to "failed;"
   retrieving the batch of events from the persistent storage; and
   updating the state associated with the batch of events to "replayed".

3. The method of claim 1, further comprising:
   receiving a request to read event data for the batch of events in one of the one or more stages;
   retrieving the state associated with the batch of events in the one of the one or more stages;
   retrieving the corresponding sub-state in the one of the one or more stages; and
   retrieving the requested event data for the batch of events from the persistent storage if the state associated with the batch of events is "committed" or if the corresponding sub-state is "complete".

4. The method of claim 3, wherein the event data for the batch of events in the one of the one or more stages is updated based on the result of processing the batch of events in the one of the one or more stages only when all of the events in the batch of events have been processed in the one of the one or more stages.

5. The method of claim 1, wherein each sub-state of the one or more sub-states is updated only when all of the events in the batch of events have been processed in the corresponding stage of the one or more stages.

6. The method of claim 1, further comprising:
   storing the state associated with the batch of events in another persistent storage separate from the persistent storage for storing the batch of events.

7. The method of claim 1, wherein the batch of events in the one or more stages are processed by the online event processing system and the offline event process system.

8. A system for event state management in stream processing, comprising:
   a processor couple to a memory;
   an input event managing unit, executed by the processor, configured to create a batch of events based on a plurality of events inputted from an external source, wherein the batch of events is associated with a state of processing the batch of events and is to be processed in one or more stages;
   a batch event storage, executed by the processor, configured to store the batch of events;
   at least one of an online event processing system and an offline event process system, executed by the processor, configured to process the batch of events in the one or more stages; and
   an event batch write managing unit, executed by the processor, configured to update the state associated with the batch of events when the processing of the one or more stages is completed, wherein the state associated with the batch of events comprises one or more sub-states corresponding to the one or more stages, and the event batch write managing unit is further configured to
   update each sub-state of the one or more sub-states to "complete" once the batch of events has been processed in the corresponding stage of the one or more stages, and
   update the state associated with the batch of events to "committed" once the batch of events has been processed in all of the one or more stages.

9. The system of claim 8, wherein, if processing of an event in the batch of events fails, the input event managing unit is further configured to:
   update the state associated with the batch of events to "failed;"
   retrieve the batch of events from the persistent storage; and
   update the state associated with the batch of events to "replayed".

10. The system of claim 8, further comprising an event batch read managing unit, executed by the processor, configured to:
    receive a request to read event data for the batch of events in one of the one or more stages;
    retrieve the state associated with the batch of events in the one of the one or more stages;
    retrieve the corresponding sub-state in the one of the one or more stages; and
    retrieve the requested event data for the batch of events from the persistent storage if the state associated with the batch of events is "committed" or if the corresponding sub-state of the one or more sub-stages is "complete".

11. The system of claim 10, wherein the event data for the batch of events in the one of the one or more stages is updated based on a result of processing the batch of events in the one of the one or more stages only when all of the events in the batch of events have been processed in the one of the one or more stages.

12. The system of claim 8, wherein each sub-state of the one or more sub-states is updated when all of the events in the batch of events have been processed in the corresponding stage of the one or more stages.

13. The system of claim 8, further comprising a batch state storage, executed by the processor, configured to:
store the state associated with the batch of events separate from the batch event storage for storing the batch of events.

14. A machine-readable tangible and non-transitory medium having information recorded thereon for event state management in stream processing, wherein the information, when read by the machine, causes the machine to perform the following:
creating a batch of events based on a plurality of events inputted from an external source, wherein the batch of events is associated with a state of processing the batch of events and is to be processed in one or more stages;
storing the batch of events in a persistent storage;
processing the batch of events in the one or more stages by at least one of an online event processing system and an offline event process system;
updating the state associated with the batch of events when the processing of the one or more stages is completed, wherein the state associated with the batch of events comprises one or more sub-states corresponding to the one or more stages;
updating each sub-state of the one or more sub-states to "complete" once the batch of events has been processed in the corresponding stage of the one or more stages; and
updating the state associated with the batch of events to "committed" once the batch of events has been processed in all of the one or more stages.

15. The medium of claim 14, further comprising:
receiving a request to read event data for the batch of events in one of the one or more stages;
retrieving the state associated with the batch of events in the one of the one or more stages; retrieving the corresponding sub-state in the one of the one or more stages; and
retrieving the requested event data for the batch of events from the persistent storage if the state associated with the batch of events is "committed" or if the corresponding sub-state is "complete".

16. The medium of claim 15, wherein the event data for the batch of events in the one of the one or more stages is updated based on a result of processing the batch of events in the one of the one or more stages only when all of the events in the batch of events have been processed in the one of the one or more stages.

17. The medium of claim 14, wherein each sub-state of the one or more sub-states is updated when all of the events in the batch of events have been processed in the corresponding stage.

\* \* \* \* \*